United States Patent [19]
Hinman et al.

[11] Patent Number: 5,940,049
[45] Date of Patent: *Aug. 17, 1999

[54] REMOTE INTERACTIVE PROJECTOR WITH IMAGE ENHANCEMENT

[75] Inventors: Brian L. Hinman, Los Gatos; Jeffrey C. Rodman, San Francisco; Philip G. Baker, Solana Beach, all of Calif.

[73] Assignee: Polycom, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/698,434

[22] Filed: Aug. 15, 1996

Related U.S. Application Data

[63] Continuation of application No. 08/546,606, Oct. 23, 1995.

[51] Int. Cl.⁶ .............................. H04N 1/00; H04N 1/387
[52] U.S. Cl. .............................. 345/2; 358/452; 358/479; 348/18
[58] Field of Search ...................... 358/479, 452, 358/434, 435, 436, 438, 439, 468, 456, 475, 471; 348/15, 13, 14, 18; 345/2, 104, 173; 178/18

[56] References Cited

U.S. PATENT DOCUMENTS

| | | |
|---|---|---|
| 3,291,905 | 12/1966 | Smith . |
| 3,971,068 | 7/1976 | Gerhardt et al. . |
| 4,016,598 | 4/1977 | Yamanaka . |
| 4,236,176 | 11/1980 | Nagumo . |
| 4,297,723 | 10/1981 | Whitby . |
| 4,322,741 | 3/1982 | Kawabayashi . |
| 4,323,925 | 4/1982 | Abell et al. . |
| 4,415,934 | 11/1983 | Konishi ................................... 358/496 |
| 4,415,981 | 11/1983 | Cutter et al. . |
| 4,426,664 | 1/1984 | Nagumo et al. . |
| 4,541,016 | 9/1985 | Ochi et al. . |
| 4,635,105 | 1/1987 | Favreau . |

(List continued on next page.)

FOREIGN PATENT DOCUMENTS

| | | |
|---|---|---|
| 0559913 | 9/1993 | European Pat. Off. . |
| 60-213178 | 10/1985 | Japan . |
| 3-41880 | 2/1991 | Japan . |
| 5268253 | 10/1993 | Japan . |

OTHER PUBLICATIONS

News Release, "Smart Technologies Announces First Windows 3.0 Based Computer Conferencing System," Oct. 21, 1991, Calgary, Alberta, Canada, 8 total pages.

D. Lelievre; "Vision industrielle: a capteur egal, mesure plus precise";MESURES vol. 52; No. 13; Oct. 19, 1987; pp. 27, 28, 30, 31, 33, 35.

Kiryati N. et al.; "Gray Levels can Improve the Performance of Binary Image Digitizers"; CVGIP Graphical Models And Image Processing; vol. 53; No. 1; Jan. 1, 1991, pp. 31–39.

*Primary Examiner*—Scott Rogers
*Attorney, Agent, or Firm*—Carr & Ferrell LLP

[57] ABSTRACT

The projector of the present invention provides a means for interactively displaying and annotating a document image at two separate locations. The projector consists of an image plate having an array of picture elements for displaying the image; a projection mechanism for projecting the image displayed by the image plate onto a projection screen; and a digitizer having a coordinate input array which corresponds to the array of picture elements of the image plate, wherein the image displayed by the image plate changes in response to coordinate inputs to the digitizer. A method for interactively annotating an image communicated between a remote and local image includes the procedure of simultaneously transmitting to the remote projector, annotations made to an image in the local projector. Image enhancement means are provided including an overlap-region calibration, a set of cross-polarizers, a high-intensity strobed flash lamp using interlaced scanning, sub-divided picture elements, and automatic gain correction.

19 Claims, 10 Drawing Sheets

U.S. PATENT DOCUMENTS

| | | | |
|---|---|---|---|
| 4,672,430 | 6/1987 | Asaida . | |
| 4,727,431 | 2/1988 | Nakamura et al. . | |
| 4,734,779 | 3/1988 | Levis et al. . | |
| 4,794,634 | 12/1988 | Torihata et al. | 379/96 |
| 4,827,085 | 5/1989 | Yaniv et al. | 178/18 |
| 4,839,634 | 6/1989 | More et al. . | |
| 4,846,694 | 7/1989 | Erhardt | 345/104 |
| 4,890,314 | 12/1989 | Judd et al. | 348/15 |
| 4,911,536 | 3/1990 | Ditzik | 345/173 |
| 4,916,550 | 4/1990 | Miyake et al. | 358/475 |
| 4,938,570 | 7/1990 | Majima et al. . | |
| 4,951,160 | 8/1990 | Nagahara et al. | 358/496 |
| 4,956,664 | 9/1990 | Hasegawa et al. | 355/43 |
| 5,014,132 | 5/1991 | Kumesawa et al. . | |
| 5,038,224 | 8/1991 | Martulli et al. . | |
| 5,097,350 | 3/1992 | Baran . | |
| 5,099,317 | 3/1992 | Takemura . | |
| 5,115,308 | 5/1992 | Onuki . | |
| 5,126,849 | 6/1992 | Senuma et al. . | |
| 5,126,855 | 6/1992 | Saito . | |
| 5,132,802 | 7/1992 | Osthues et al. . | |
| 5,150,217 | 9/1992 | Senuma et al. . | |
| 5,181,104 | 1/1993 | Sugishima et al. | 358/75 |
| 5,194,959 | 3/1993 | Kaneko et al. . | |
| 5,206,520 | 4/1993 | Filo | 250/568 |
| 5,216,512 | 6/1993 | Bruijns et al. . | |
| 5,231,698 | 7/1993 | Forcier | 395/146 |
| 5,329,444 | 7/1994 | Takahashi et al. | 364/401 |
| 5,374,952 | 12/1994 | Flohr | 348/15 |
| 5,396,269 | 3/1995 | Gotoh et al. | 348/14 |
| 5,418,560 | 5/1995 | Yasuda | 348/14 |
| 5,432,525 | 7/1995 | Maruo et al. | 345/2 |
| 5,515,181 | 5/1996 | Iyoda et al. | 358/474 |
| 5,744,795 | 4/1998 | Bianchi | 358/475 |

…

REMOTE INTERACTIVE PROJECTOR WITH IMAGE ENHANCEMENT

CROSS REFERENCE TO RELATED APPLICATIONS

This application is a continuation of U.S. patent application Ser. No. 08/546,606, filed Oct. 23, 1995, and is related to U.S. patent application Ser. No. 08/461,175, filed Jun. 5, 1995, now U.S. Pat. No. 5,568,279, in that the applications share common subject matter and common inventors.

BACKGROUND OF THE INVENTION

1. Field of the Invention

This invention relates to a projection machine, and more specifically to a projector for generating, annotating, and storing documents, and for interactively communicating the documents and annotations with a remote projector or other electronic device.

2. Description of the Background Art

Document projection devices are well known. The traditional device is a transparency machine consisting of a light box and a beam projection apparatus. The light box contains a projection lamp and a top surface of glass. The transparency is placed upon the glass surface and the lamp shines up through the transparency forming an image beam which is collected, focused, and projected by the beam projection apparatus onto a screen. The beam projection apparatus generally consists of a mirror diagonally positioned between a pair of lenses.

These devices are simple in construction, but offer little flexibility for storing, editing or manipulating the images. In order for the image of a document to be clearly visible on the screen, generally the ambient room light must be reduced. This makes it difficult for viewers in the room to also view other documents or materials while the projected document is being viewed.

Further, no capability exists for communicating these images simultaneously to a remote user, or for a remote user to interactively make changes to the projected image. A number of teleconferencing systems have been designed to enable transmission of images together with audio signals to remote locations. These systems, however, are primarily used for images of different speakers at remote locations, and there are often drawbacks to these systems when used for transmission of images of hard copy documents, partly because of the fine resolution that is often required and also the restrictions on lighting conditions. For example, U.S. Pat. No. 5,369,269, issued to Gotoh et al., discloses a television telephone which performs simultaneous communication of voices and images, and is intended to serve as a multimedia terminal. This device has a camera which is intended for use with images of documents as well as live figures. However the camera and display must be tilted to reduce the effects of external illumination and facilitate viewing of the screen.

What is needed is an apparatus that is designed for projecting documents, which allows the documents to be easily annotated and stored, and which can be simultaneously projected and annotated using a second projector at a remote location. In addition, it is desirable to reduce the unwanted effects of external illumination, to compensate for the effects of lens aberrations, uneven illumination, and various optical reflective properties of different documents, and to provide sufficient resolution to produce readable images of fine print documents.

SUMMARY OF THE INVENTION

An interactive projector photographs and stores the image of a document using a CCD camera. The digital image is stored by a processor-based motherboard to an array of image memory. The contents of the memory are displayed on a transparent Liquid Crystal Display (LCD) image plate. Using a projection lamp to provide rear lighting to the image plate, the image displayed on the image plate is projected onto a screen for viewing. A transparent pressure-sensitive digitizer is affixed to the image plate and permits a user, with the aid of a stylus, to point to coordinates on the digitizer and to change the transparency of corresponding picture elements on the image plate. The "local" projector may be connected to a "remote" projector or communication device using a modem. When the projector is connected to a remote projector, annotations made to the image plate of the local projector are simultaneously transmitted to the remote projector. Also during interactive use, changes made to the image plate of the remote projector are received and used to update the image plate of the local projector.

The camera is actually a dual CCD camera in which the two cameras are focused on different portions of the image with some overlap, using a beam splitter. Means are provided for comparing the visual signals from the two cameras to provide a seamless match between the resulting images, taking into account differences in brightness, contrast, and "left-right" sensitivity between the cameras, and variations in the illumination. Undesirable glare from specular reflection is removed with the use of crossed polarizers in the optical path of the cameras. The document illumination is provided by a flash lamp, to vitiate the effects of ambient room light and other external illumination, and a technique is provided to compensate for illumination differences between different flashes. The individual pixels of the images are composed of a 3×3 matrix of sub-pixels to enable the cameras to record 8 shades of gray and provide improved gray scale fidelity. Lens abberation corrections are implemented by a digital FIR image sharpening filter. Finally, automatic gain correction is provided to maintain the quality of the resulting image, regardless of the color or optically reflective quality of the document being recorded. The resulting images are substantially improved over the images of documents that are transmitted or projected by other means, both in resolution and readability and in robustness with respect to the ambient illumination environment.

DESCRIPTION OF THE PREFERRED EMBODIMENT

Figure 1:
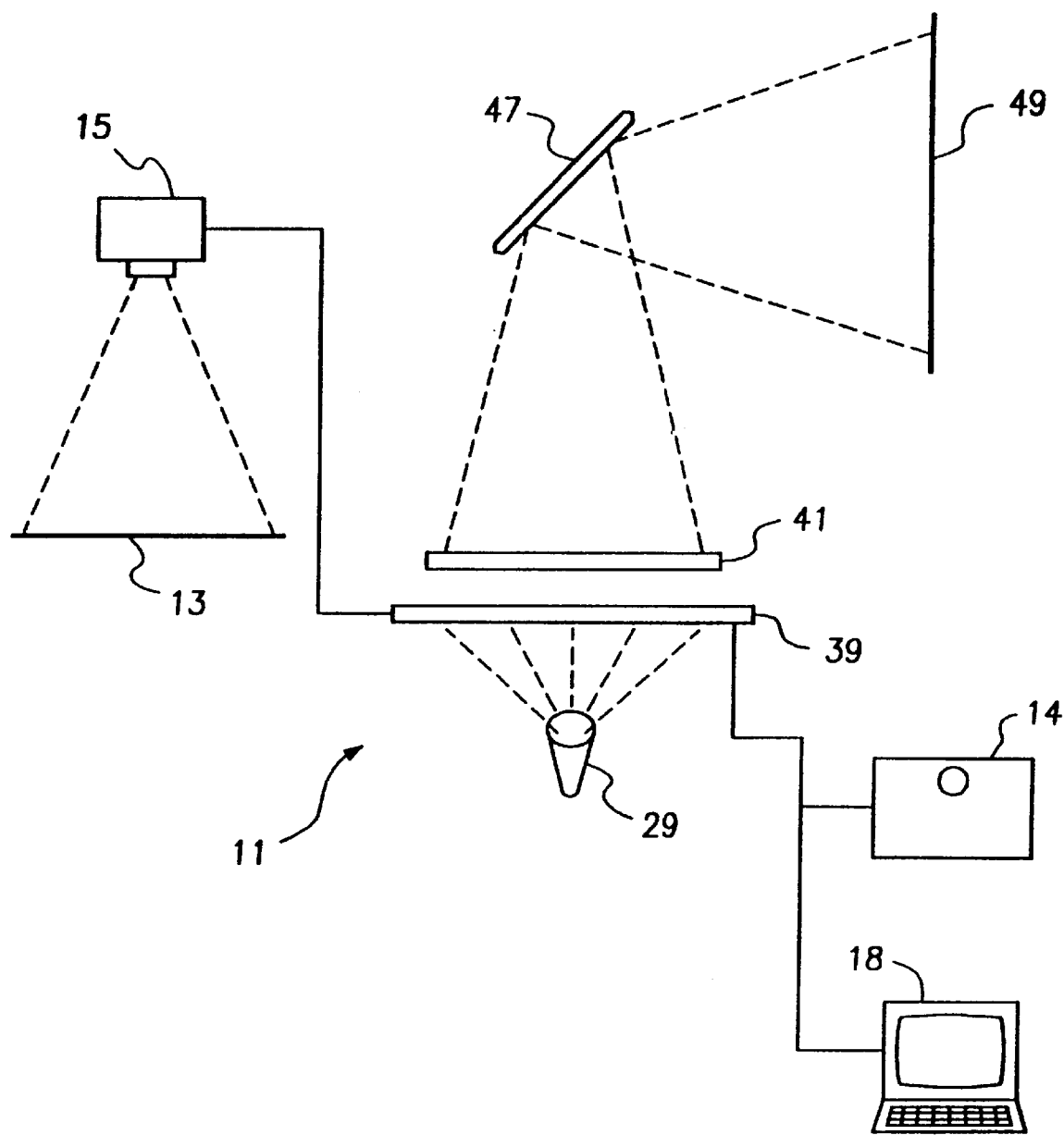
FIG. 1 is a schematic diagram showing a preferred embodiment of the projector of the present invention.

Referring now to FIG. 1, an overview of the preferred embodiment of a remote interactive projector 11 is shown. Document 13 is photographed using camera 15 and transmitted to image plate 39. A user is subsequently able to annotate or otherwise modify image plate 39 using digitizer 41. The image appearing on image plate 39 is then projected to screen 49 using rear projection lamp 29. Mirror 47 is used to position the projection of the image on screen 49. The annotated image appearing on image plate 39 can simultaneously be printed on printer 14, transmitted to a remote projector (not shown) via modem 16 (FIG. 2), or manipulated by a general purpose computer 18. Projector 11 is also capable of receiving images for display on image plate 39 via modem 16 and computer 18.

Figure 2:
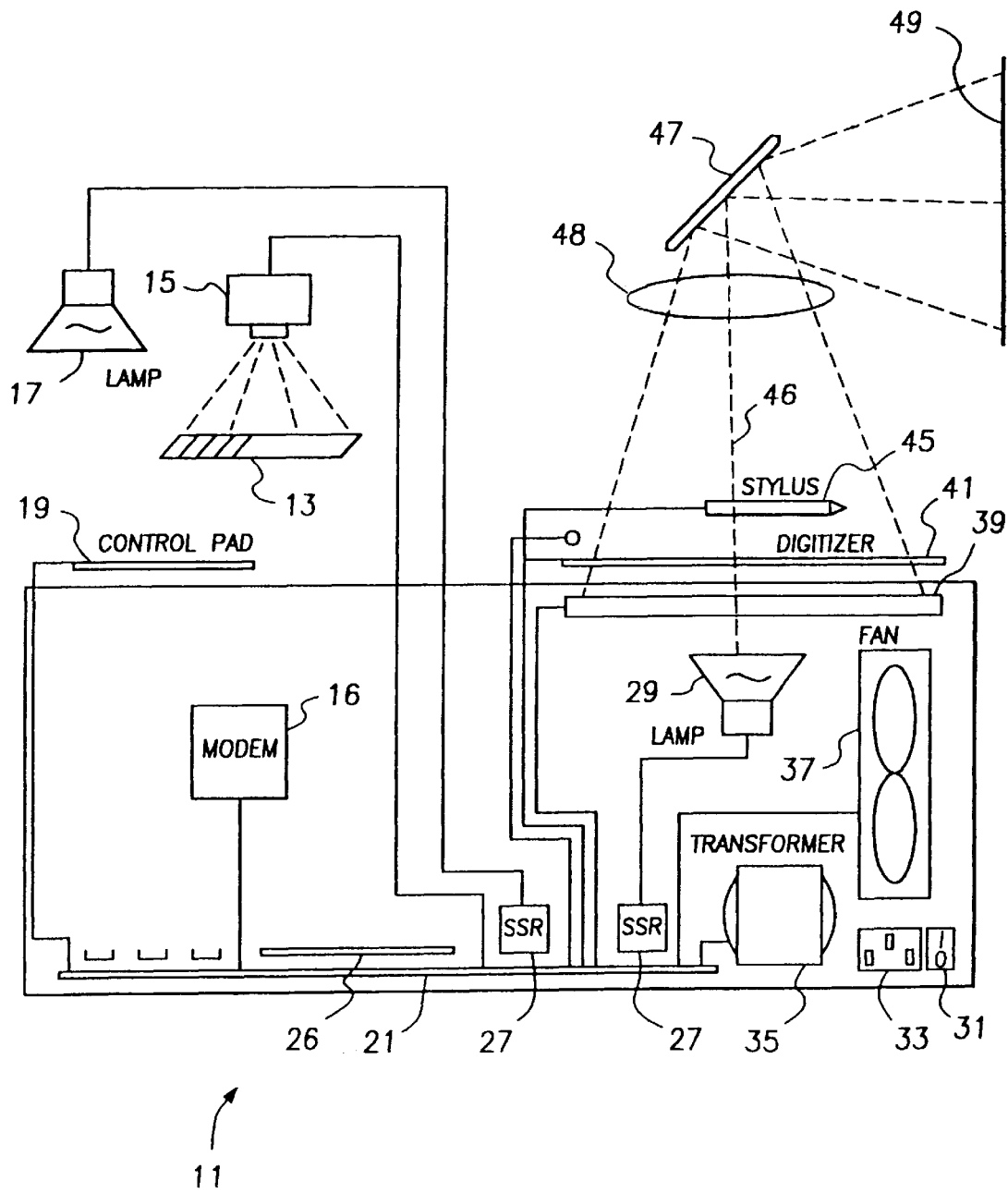
FIG. 2 is a schematic diagram showing details of the projector of FIG. 1.

Referring now to FIG. 2, a more detailed illustration is provided of projector 11 shown in FIG. 1. Document 13 is a sheet of text or drawing that the user wishes to display, annotate and transmit to a remote user. The document can be a single sheet, a page from an open book, or a transparency. Lamp 17 provides lighting for the text, either from the top side of document 13, in the case of an opaque document, or from the backside of document 13 where the document is a transparency. A digital image is then collected using a dual CCD camera 15. The digital image collected by CCD camera 15 is then transmitted and stored in memory 26 which resides on motherboard 21. Motherboard 21 is a microprocessor-based electronic controller for operating and effecting the various functions of projector 11. Once collected, the stored image is transferred and displayed by image plate 39. In the preferred embodiment, image plate 39 is a conventional liquid crystal display (LCD) panel having an array of picture elements which individually convert from transparent to opaque in response to applied digital signals. Rear projection lamp 29 shines through image plate 39 and projects the image displayed by the opaque picture elements of the image plate.

Digitizer 41, in the preferred embodiment, is a transparent, pressure sensitive plastic sheet which rests atop image plate 39. Digitizer 41 contains an array of coordinates which coincide or map to the array of picture elements of image plate 39. Using digitizer 41 in conjunction with stylus 45, the user is able to make alterations to the image projected through image plate 39. For each "mark" made by pressing stylus 45 on digitizer 41, an identical digital representation of the mark is stored in memory 26 and displayed by image plate 39. "Marking" on the digitizer 41 with stylus 45 does not physically alter the surface of digitizer 41, but rather each successive digitizer 41 coordinate pointed to by stylus 45 results in the image plate 39 picture element which coincides with that pointed digitizer 41 coordinate changing from transparent to opaque. Various alternative embodiments of digitizer 41 will be readily apparent. Rather than rest atop image plate 39, digitizer 41 could be embodied as a conventional digitizing pad which is positioned adjacent to image plate 39, and the position of stylus 45 would appear as a cursor notation on image plate 39.

Mirror 47 lies in the projection path produced by the rear illumination of image plate 39 by lamp 29, and is used to reflect the projected image of the rear-illuminated image plate 39 onto a wall-mounted or free-standing vertical projection screen 49. Projection lens 48 is also positioned in projection path 46, adjacent to mirror 47, for the purpose of focusing and magnifying the projected image.

Conventional power components are used to supply projector 11. Plug 33 supplies 120 VAC power to transformer 35. Connection to the mains is controlled via ON/OFF switch 31. Transformer 35 steps the mains power to a voltage level suitable for supplying the digital components on motherboard 21. High voltage components such as illumination lamp 17 and projection lamp 29 are controlled from motherboard 21 using solid state relays 27. Cooling is provided to the projector electronics and lamps using fan 37. Functionality and control over motherboard 21 is generally provided through control pad 19, which is more completely discussed in FIG. 3.

Figure 3:
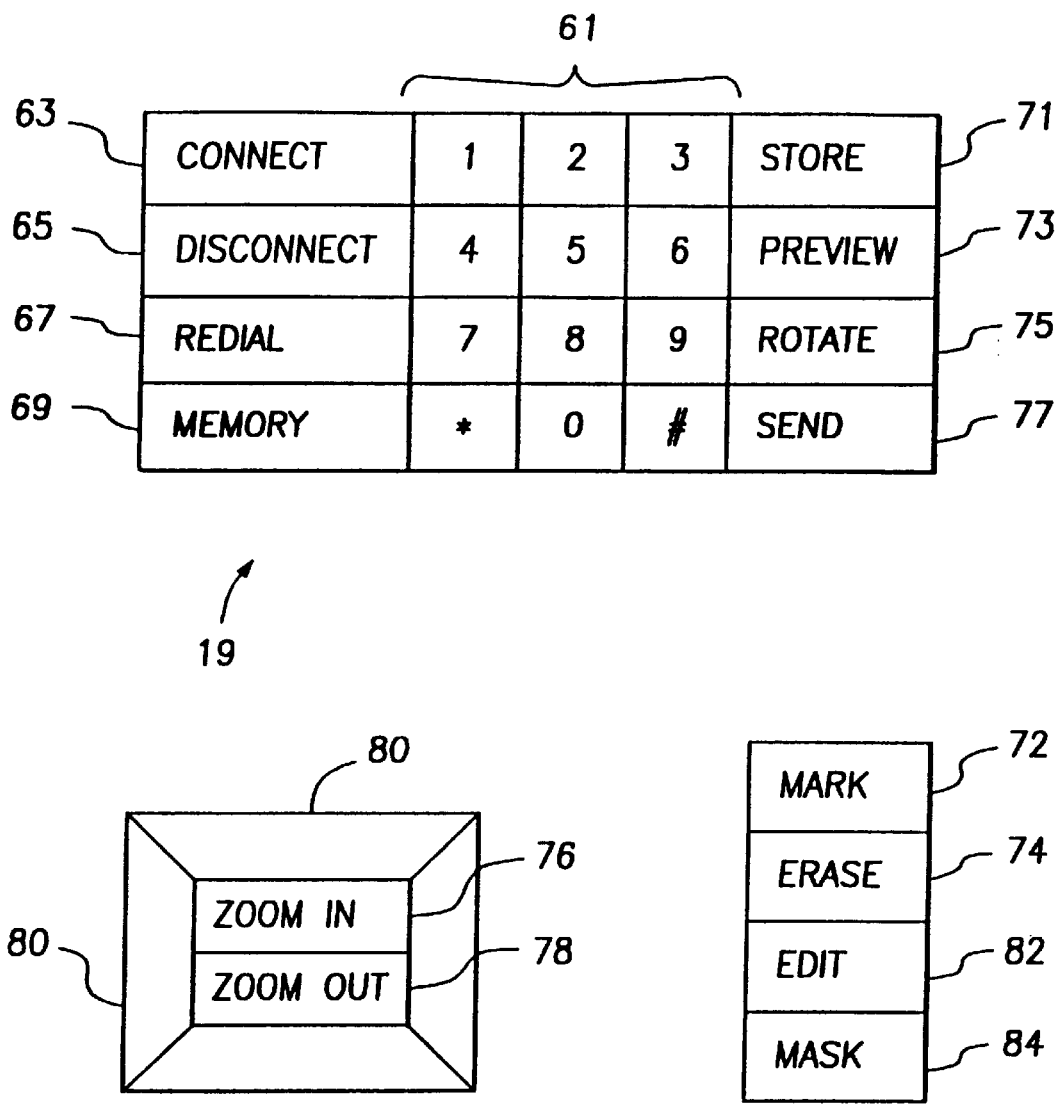
FIG. 3 is a diagram showing the control pad of the projector shown in FIG. 1.

Referring now to FIG. 3, a detailed diagram is shown of the preferred embodiment of control pad 19. Dial pad 61 is used to dial a remote projector unit connected via modem 16 (shown in FIG. 2). Dial pad 61 contains the traditional telephone numbers "1"–"9", "*", and "#". Pads 63–69 to the left of dial pad 61 are used to control communications between projector 11 and a remote projector unit (not shown). Connect pad 63 is used to gain access to the telephone line via modem 16, prior to dialing the telephone number of the remote projector. Disconnect pad 65 is used to discontinue communication with the remote protector, and is the equivalent of "hanging up" following the completion of the communication activities. Redial pad 67 allows redialing of the last dialed phone number. Memory pad 69 is used in conjunction with the numeric dial pad 61 to store telephone numbers of frequently dialed remote projectors or other remote communication devices such as facsimile machines and computers.

Pads 71–84 are used to control image manipulation within projector 11. Store pad 71 operates to store an image of document 13 using camera 15. Pressing store pad 71 effectively erases the contents of memory 26 and stores the new image of the photographed document. Depressing preview pad 73 enables previewing the document image recorded by camera 15 on image plate 39, prior to storing or sending the image to a remote communication device. Rotate pad 75 is used to rotate the document in memory. This rotation process is the electronic equivalent of physically rotating document 13 as it appears with respect to camera 15. Send pad 77 is used to transmit the digital information recorded by camera 15 to a remote projector or communication device.

Mark pad 72 is used to control the annotation operation of stylus 45. Following the pressing of mark pad 72, whenever stylus 45 is pressed against digitizer 41, the picture elements of image plate 39 are transformed from transparent to opaque. Erase pad 74 performs the inverse function to mark pad 72. Stylus marks made with this function engaged, cause opaque picture elements on image plate 39 to change to transparent. Erase pad 74 allows the user to erase portions of the image displayed on image plate 39, using stylus 45. Zoom In pad 76 causes a telephoto lens on camera 15 to zoom in and thereby causes specific sections of the document to be enlarged. Zoom Out pad 78 reverses the magnification of the lens in camera 15, thereby allowing more of the document 13 page to be displayed. In an alternative embodiment, the zoom feature operates on the image stored in memory 26 rather than operating on camera 15. Depressing Zoom In pad 76 causes image data stored in memory 26 to be algorithmically expanded to allow the user to fill image plate 39 with only a subset of the image data stored in memory 26. In much the same way as the user zoomed in and out on document 13 in the preferred embodiment by adjusting the magnification of the telephoto lens, the user in this alternative embodiment is able to zoom in on data stored in memory 26. Directional arrows 80 permit the user to select portions of the document image stored in memory 26 to be displayed on image plate 39. Using the appropriate direction arrows 80, the user can pan up, down, to the left and to the right on document 13.

Edit pad 82 enables the user to cut material displayed on image plate 39. By pressing and holding edit pad 82, the user draws a box using stylus 45 on digitizer 41 around undesired material displayed on image plate 39. By releasing the edit pad 82, the image data stored in memory 26 relating to the encircled image displayed on image plate 39 is suppressed from being displayed on image plate 39. In a similar manner, mask pad 84 is used to suppress the display of material contained outside of the inscribed area. By depressing mask pad 84 and inscribing image material displayed on image plate 39, the image material outside the area will be masked and not displayed.

Figure 4:
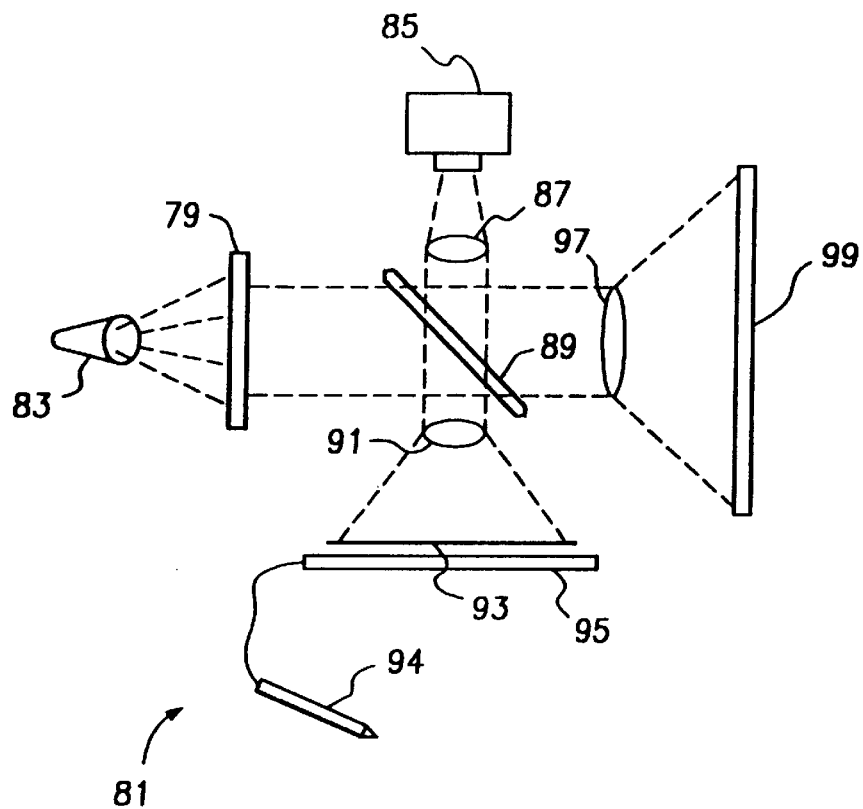
FIG. 4 is a schematic diagram showing an alternative embodiment of the projector of the present invention.

Referring now to FIG. 4, an alternative embodiment, projector 81, of the present invention is shown. In this alternative embodiment, document 93 is placed on top of digitizer 95 and photographed using camera 85. Document 93 is then removed from digitizer 95 and the camera then sends the image to image plate 79. Document 93 and camera 85 could also be arranged adjacent to digitizer 95; however, the configuration shown provides a convenient alignment surface for document 93.

Projection lamp 83 projects through image plate 79 to beam splitter 89. Part of the projected image from image plate 79 passes through beam splitter 89 to projection lens 97 where the image is magnified and displayed on screen 99. The remainder of the projected image from image plate 79 is reflected by the beam splitter 89 onto digitizer 95, where stylus 94 can be used to annotate the image as discussed in the preferred embodiment above. Digitizer 95 preferably has a reflective surface to allow easy viewing of the reflected image from beam splitter 89. The annotations are transmitted back to image plate 79 where they are combined with the original document image to produce an annotated document image which then forms a composite projected image on screen 99.

Figure 5:
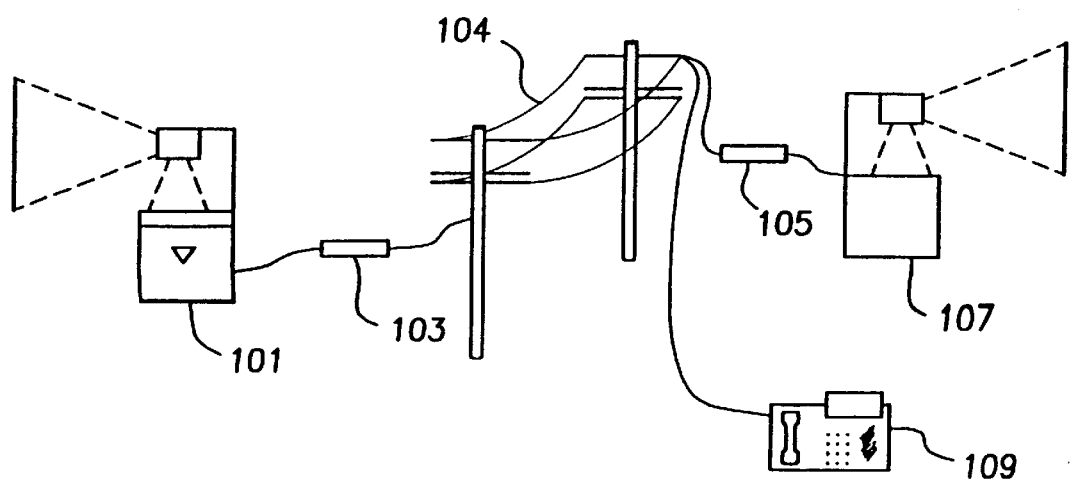
FIG. 5 is a schematic diagram showing a pair of projectors connected for interactive operation.

Referring now to FIG. 5, a schematic diagram shows a pair of projectors 101 and 107 connected through modems 103 and 105 and telephone lines 104. FIG. 5 is presented for the purpose of discussing the method for using two projectors to interactively transmit images and image annotations. For the purpose of this methodology discussion, projector 101 will be referred to as the "local" projector and projector 107 will be referred to as the "remote" projector. In order to more clearly specify features of the projectors 101, 107 when discussing the interactive operation, the single set of feature numbers referenced in FIG. 2 will be used; however, projectors 101 and 107 are separate units and each has its own complement of the components shown in FIG. 2. Modems 103 and 105 are shown to be separate from the their respective projectors 101 and 107; however, it should be noted that these modems are of conventional technology and are housed within each of the projectors 101 and 107 and electrically connected to motherboard 21 (FIG. 2).

The user operates projector 101 by first aligning camera 15 with document 13. Illumination of document 13 by lamp 17 may be required to obtain a sufficiently bright image of document 13. Preview pad 73 (FIG. 3) is used to adjust document 13 so that its image is properly centered on image plate 39. The document image is then stored using store pad 71. Communication is established with the remote projector 107 by dialing the telephone number of remote projector 107 using dial pad 61 on local projector 101 and by subsequently pressing connect pad 63. Remote projector 107 will answer the telephone call placed by local projector 101 and will automatically initiate communication with projector 101 when the call is identified as coming from another projector.

Once a connection between projectors 101 and 107 is made, local projector 101 transmits its image stored in memory 26 to remote projector 107 in response to activation of send pad 77 of projector 101 by the user. Remote projector 107 receives the image from local projector 101 and stores the received image in its memory 26. The image stored by remote projector 107 is subsequently operated on as though the stored image were collected and stored by camera 15 of remote projector 107. The images contained in memories 26 of both projectors 101 and 107 are now identical. Once the transmitted image is stored by remote projector 107, users operating the two projectors 101 and 107 can begin interactively annotating the common stored image. The process for annotating the image is described with respect to FIG. 2 above. The user operating local projector 101, for instance, "marks" on the image by pressing and dragging stylus 45 along the coordinate surface of digitizer 41. Picture elements on image plate 39 of local projector 101 which coincide with the various marked coordinates of digitizer 41 are converted from transparent to opaque (or opaque to transparent if erase pad 74 is engaged). When local projector 101 is connected to remote projector 107, the marks which are generated on image plate 39 of local projector 101, are simultaneously transmitted to and appear on image plate 39 of remote projector 107.

The updating of remote projector 107 occurs in a manner analogous to the updating of image plate 39 of local projector 101. Annotations which are generated by marking local projector 101 digitizer 41 with stylus 45 are decoded as coordinates by the processor resident on motherboard 21 of local projector 101. Each coordinate pointed to by stylus 45 on digitizer 41 is decoded and used to update memory 26. Since image plate 39 displays the contents of memory 26, changing the contents of memory 26 also has the effect of changing the image displayed on image plate 39. When local projector 101 is connected to a remote projector 107, the coordinate decoded by local projector 101 is simultaneously transmitted to the processor on motherboard 21 of remote projector 107 via the path created by modem 103, telephone line 104 and modem 105. This transmitted coordinate is received by remote projector 107 and used to update its memory 26 and consequently the image plate 39 of remote projector 107.

Correspondingly, changes made to memory 26 of remote projector 107 are transmitted to and received by local projector 101, resulting in a change to memory 26 and the image displayed on image plate 39 of local projector 101. It should be noted that following the initial transmission of the document 13 image, only changes to memory locations are transmitted to and from the two projectors 101 and 107. When communication between projectors 101 and 107 is completed, disconnect pad 65 is pressed to release the telephone line and break the communication link.

Although the above discussion with reference to FIG. 5 describes communication between two projectors, multiple projectors may be similarly linked using a distributed communication network or conference call telephone connection, and thereby operate interactively.

Figure 6:
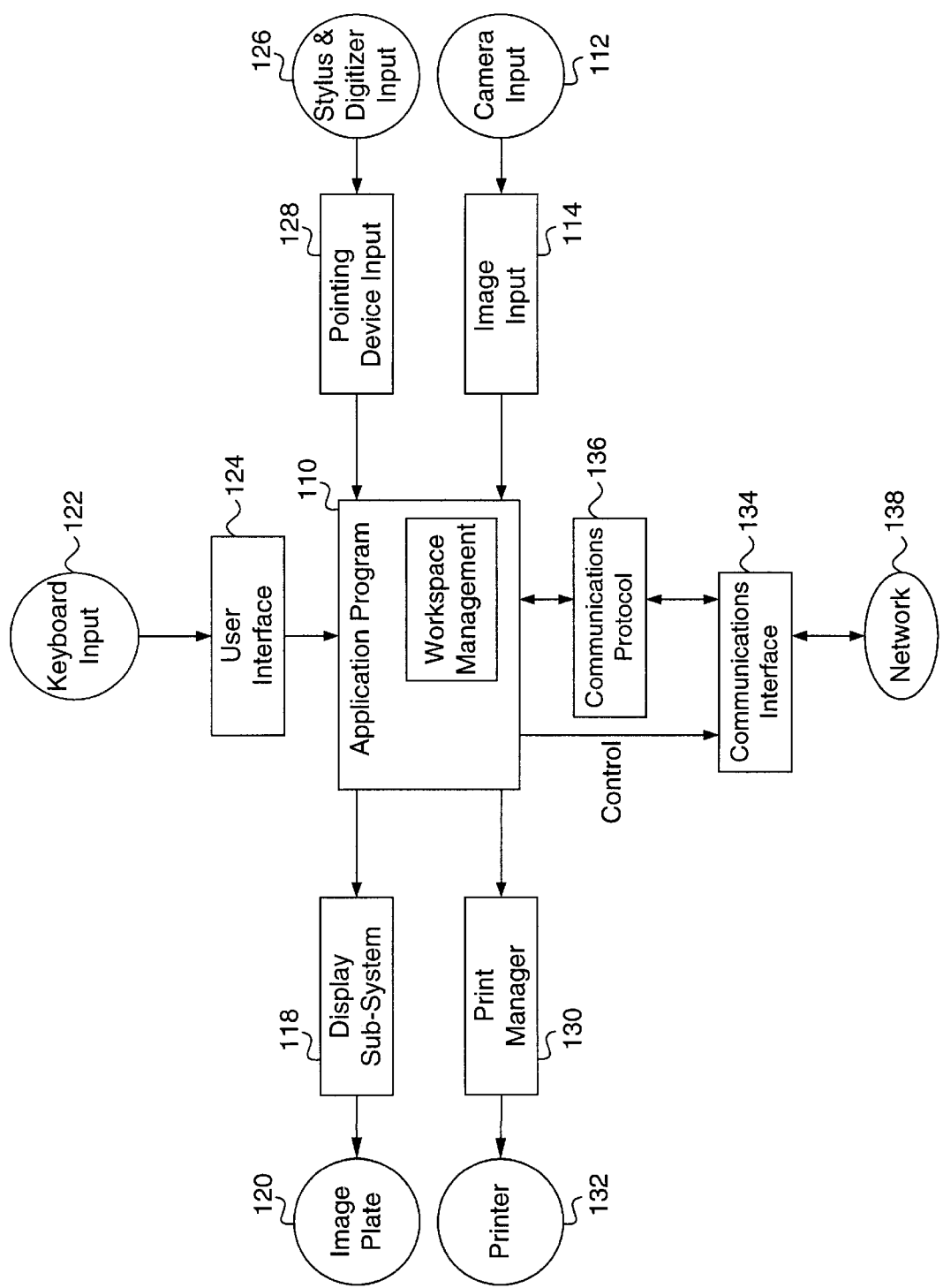
FIG. 6 is a schematic diagram of the logical organization of the projector of the present invention, indicating the manner in which data is exchanged between the components of the system.

FIG. 6 shows a schematic diagram of the logical organization and data flow within projector 11. Application program 110 receives camera input 112 data through image input 114 and responsively provides the received data to image plate 120 through display sub-system 118. A system user may control projector 11 using keyboard input 122 which is provided to application program 110 through user interface 124. Data displayed on image plate 120 may be modified using stylus and digitizer input 126 which is provided to application program 110 through pointing device input 128. Data displayed on image plate 120 may be printed by application program 110 using print manager 130 to control printer 132. Data displayed on image plate 120 may also be supplied by application program 110 to network 138 via communications interface 134 according to communications protocol 136.

Figure 7:
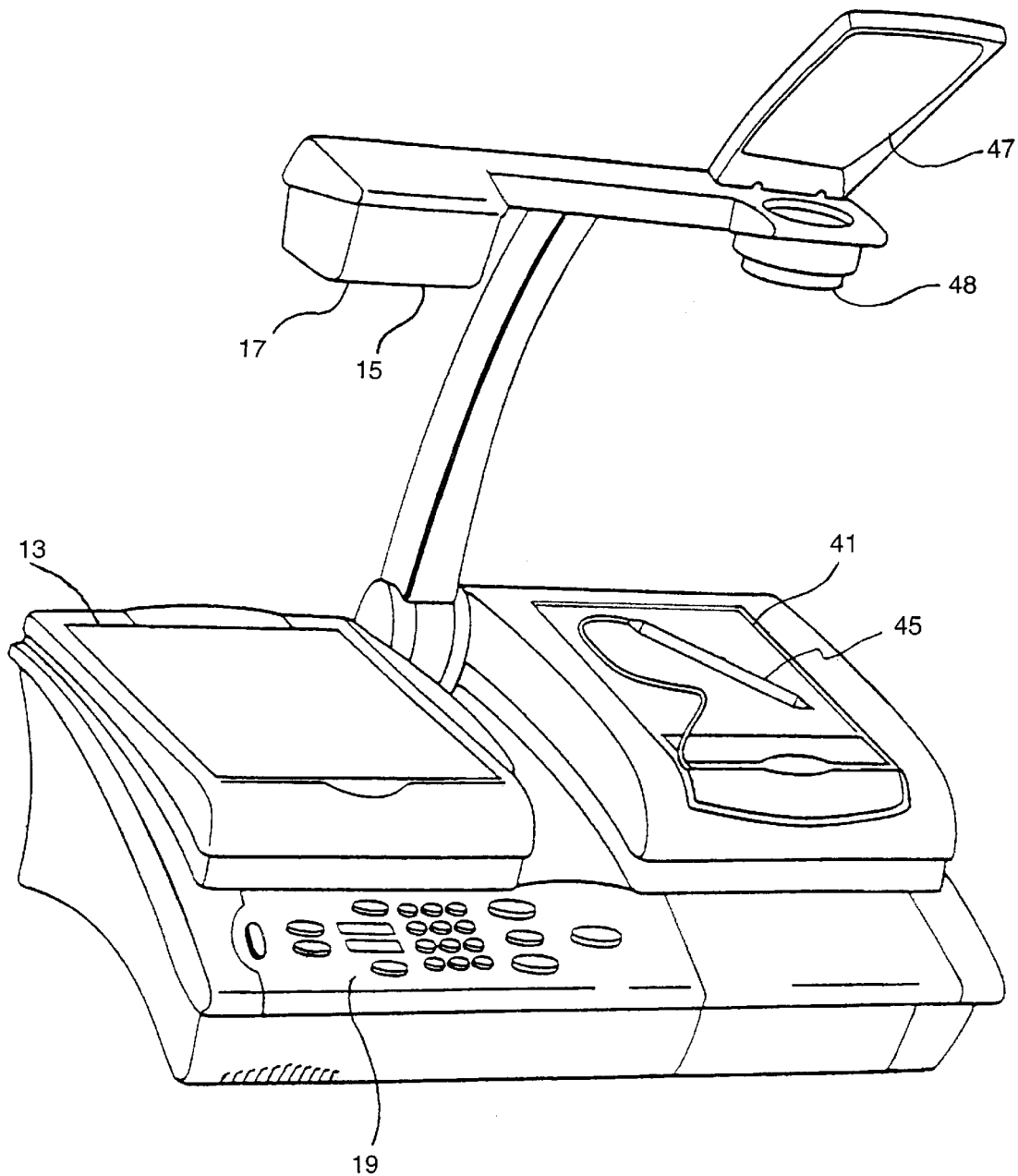
FIG. 7 is a perspective drawing of the projector of the present invention.

FIG. 7 is a perspective view of a preferred embodiment of a remote interactive projector 11 with image enhancement according to the present invention. Projector 11 includes camera 15 and lamp 17 to capture images of document 13. Control panel 19 may be used by a system user to control operation of projector 11. Digitizer 41 may be used in conjunction with stylus 45 to alter the captured images of document 13. Projection lens 48 focuses the projected image of document 13 and supplies the focused image to mirror 47 which reflects the image to a projection screen (not shown) for viewing.

Figures 8, 11:
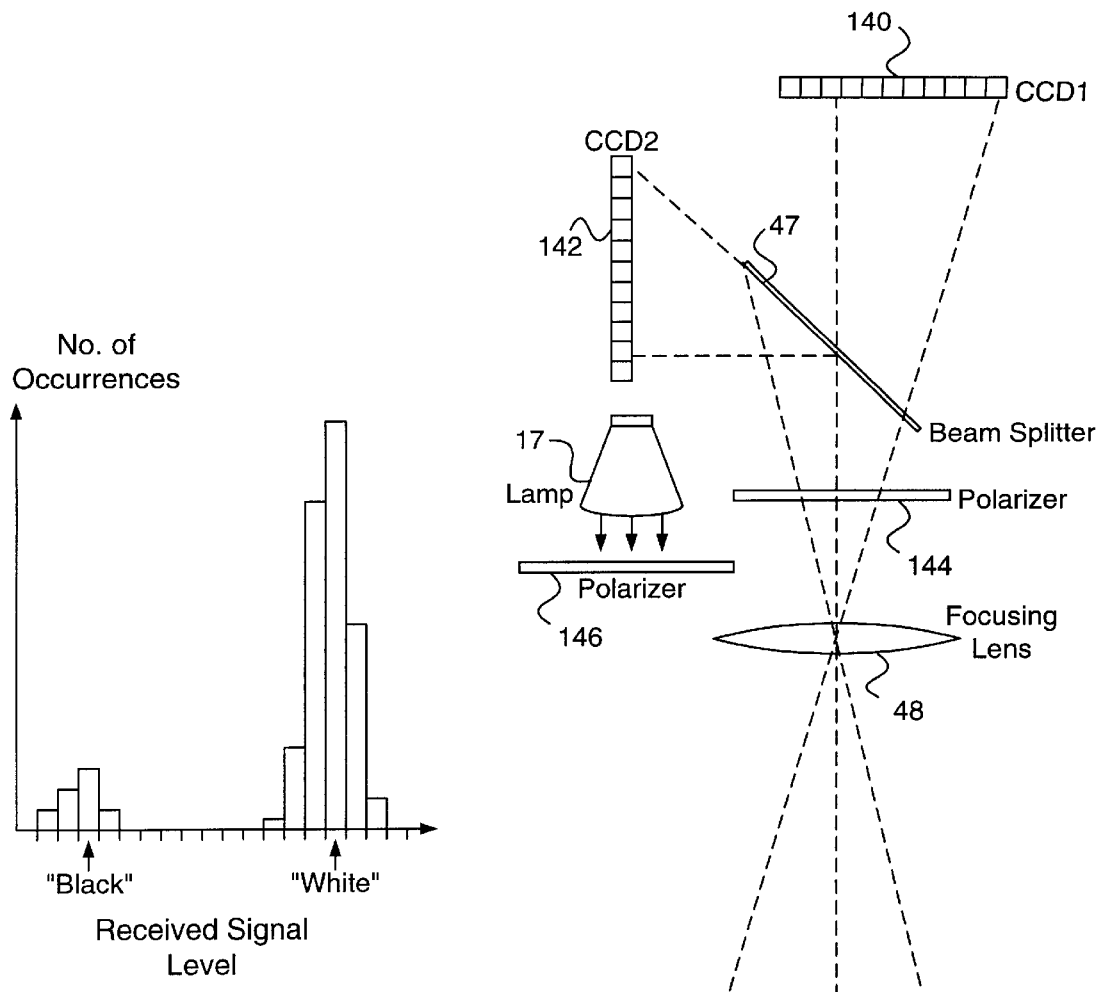
FIG. 8 is a schematic diagram showing a preferred embodiment of the present invention including a dual CCD camera and a beam-splitting mirror assembly for greater image resolution.
FIG. 11 is a histogram plot of signal levels against number of occurrences for the signals in the detecting elements of the CCD camera.

FIG. 8 is a schematic diagram showing a preferred embodiment of the present invention to achieve greater image resolution. In the preferred embodiment, camera 15 is a dual CCD camera ("CCD1" 140 and "CCD2" 142) arranged as shown in FIG. 8. Document 13 is illuminated by lamp 17, and the reflected light passes through focusing lens 48 to mirror 47 which is half-silvered and serves as a light-beam splitter. In operation, part of the reflected light from document 13 passes through mirror 47 to CCD1 140, and the remaining light is reflected by mirror 47 into CCD2 142. As shown in FIG. 8, both CCD1 140 and CCD2 142 lie in different overlapping portions of the focal plane of lens 48, and they capture different portions of document 13.

Lamp 17 may be located in the housing adjacent to camera 15, including CCD1 140 and CCD2 142. It is desirable to remove the glare caused by lamp 17 resulting in specular reflection of light from document 13. This is particularly a problem for documents having a glossy surface. The present invention solves this problem using crossed polarizing filters. A first optical polarizer 144 is placed in the optical path between document 13 and mirror 47. A second optical polarizer 146 is located in the optical path between lamp 17 and document 13, but the second polarizer 146 has a polarization direction perpendicular to that of the first polarizer 144. The net effect of this configuration of the two polarizers is to remove from the image all signals produced by specularly reflected light, leaving only the image signal produced by diffuse reflection.

The illumination of document 13 is further produced by a series of high-intensity flashes from lamp 17. Typically, lamp 17 is a flash lamp of approximately 300 watts which emits light flashes of about 300 microseconds in duration. The flash intensity of lamp 17 is much greater than ordinary ambient room lighting, and hence the effects of background illumination are eliminated by this technique. Lamp 17 strobes the light flashes at intervals of approximately 1/50 of a second. Cameras CCD1 140 and CCD2 142 are alternately activated, with one camera capturing an image during each flash and each camera capturing an image every other flash of lamp 17. Thus, the total image rate for both cameras is approximately 25 frames per second.

In order to compensate for variations in illuminating light intensity from flash to flash, projector 11 carries out an "interlace compensation technique" which utilizes the fact that the image pixels are arranged in a raster pattern having rows and columns. The scan of these pixels is "interlaced". Considering the raster pattern rows to be numbered consecutively from top to bottom of an image plane, the oddnumbered rows are scanned after one flash of lamp 17. The next flash produces a scan of the even-numbered rows. The total image is generated by interlacing the results of the two scans, i.e. interlacing the odd-numbered rows and even-numbered rows. Thus, the total image is produced by two flashes. This technique averages out the effects of variations of illumination intensity between successive flashes of lamp 17.

Figure 9:
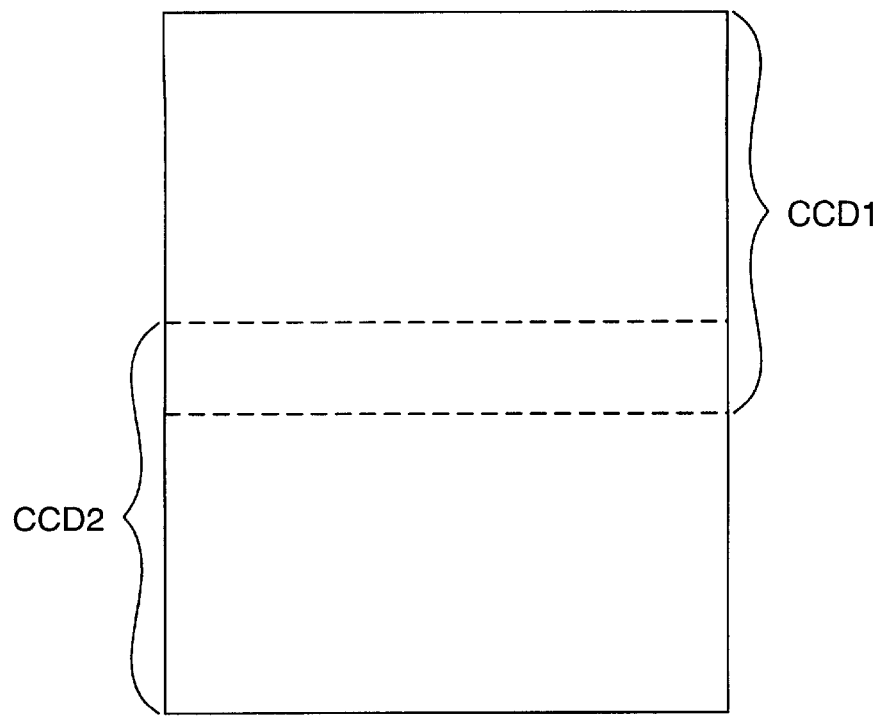
FIG. 9 is a schematic drawing illustrating the image plane of document 13 with regions of the plane captured by cameras CCD1 and CCD2.

FIG. 9 is a schematic drawing illustrating the image plane of document 13 with regions of the plane that are captured by cameras CCD1 and CCD2. These two regions captured by CCD1 140 and CCD2 142 are contiguous and in fact overlap slightly (this overlap region is exaggerated in the FIG. 9 drawing for purposes of clarity). It will be appreciated that the present invention's technique of using multiple cameras increases the overall effective resolution of the system, since each camera captures only part of the total image. It is desirable, however, to seamlessly combine the images from CCD1 140 and CCD2 142 and to minimize any image discontinuity arising from differences of sensitivity and efficiency between CCD1 140 and CCD2 142.

Figure 10:
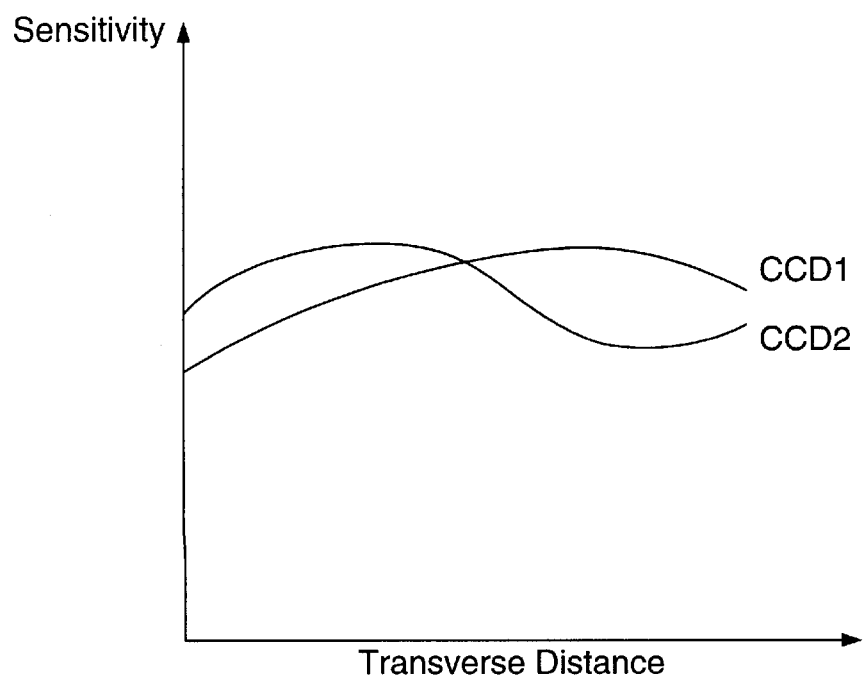
FIG. 10 is a typical plot of the sensitivity of cameras CCD1 and CCD2 along a line crossing the image-plane in the region where the cameras' capture-areas overlap.

FIG. 10 is a typical plot of the sensitivity of CCD1 140 and CCD2 142 along a line crossing the image-plane in the region where the cameras' capture-areas overlap (the FIG. 10 drawing is also exaggerated for purposes of clarity). The present invention includes a calibration process to compensate for the FIG. 10 sensitivity differential between CCD1 140 and CCD2 142. The two cameras capture an image of a blank document 13 and then the output signals of CCD1 140 and CCD2 142 are compared using the signals from the overlap region, on a pixel-by-pixel basis. For each pixel, the average signal is computed, and then the signals from each camera are multiplied by a correction factor. In other words, the cameras are calibrated so that the camera effective sensitivity in the overlap region is the same for both cameras.

This calibration technique is also used to eliminate left-right intensity variations arising from irregular illumination of document 13, especially towards the edges of document 13 ("rolloff"). The signals for a row of pixels in the overlap region across the image plane are averaged, and then each pixel signal is multiplied by a correction factor to obtain a resulting image that is constant in density across this region. The correction factor for a given pixel at a certain transverse distance across the image is then applied to all other pixel signals corresponding to this same distance. The resulting image shows no "seam" or discontinuity in the region of overlap.

FIG. 11 shows a histogram of empirically-derived CCD camera 15 output signals used for determining a level of automatic gain correction to maintain high-quality images of document 13. The preferred embodiment of the present invention seeks to provide high-quality images regardless of the color or optically-reflective properties of document 13. Paper surface-texture or "finish" typically varies considerably in reflective properties, ranging from the relatively low reflectivity of a buff finish to the relatively high reflectivity of a glossy finish. Further, paper color may vary from absolute white to off-whites and even includes non-white shades or pastels.

To compensate for these variable properties of document 13, a typical document 13 is used to generate a histogram such as that shown in FIG. 11. Typical document 13 used to generate the FIG. 11 histogram is preferably of the same type generally used by projector 11 in order to closely simulate actual operational conditions. CCD camera 15 captures an image of typical document 13 and provides an array of output signals corresponding to individual pixels of CCD camera 15. The individual pixel output signals of CCD camera 15 vary in voltage level, with pixels in the black region having a relatively low voltage level and pixels in the white region having a relatively high voltage level.

The FIG. 11 histogram depicts a sampling of the pixel elements of CCD camera 13 made while capturing typical document 13, and shows the received voltage levels plotted against the number of occurences of respective received voltage levels. The preferred embodiment of the present invention performs the automatic gain correction in the black region by selecting a maximum black histogram bar having the greatest number of occurrences and defining it as reference black for typical document 13. The present invention performs the automatic gain correction in white region by selecting a maximum white histogram bar having the greatest number of occurences and defining it as reference white for typical document 13. The automatic gain correction procedure thus establishes a reference black and a reference white which are not necessarily at the extreme limits of a black-white saturation scale and thereby compensates for variations in optical properties of typical document 13. In the preferred embodiment, the automatic gain correction procedure of FIG. 11 may be repeated whenever the optically-reflective properties or color of document 13 are changed.

The present imaging system also preserves gray-scale information on the documents that are reproduced. Unlike other document reproduction systems such as facsimile (FAX) scanners, the picture elements of the image are not limited merely to black or white, but include the fact that the original object giving rise to the image may be gray. This is done by combining groups of pixels into "super-pixels". Each super-pixel is a 3×3 array of sub-pixels. The distribution of the sub-pixels between "black" and "white" is determined by the shade of gray in the original object.

Figure 12:
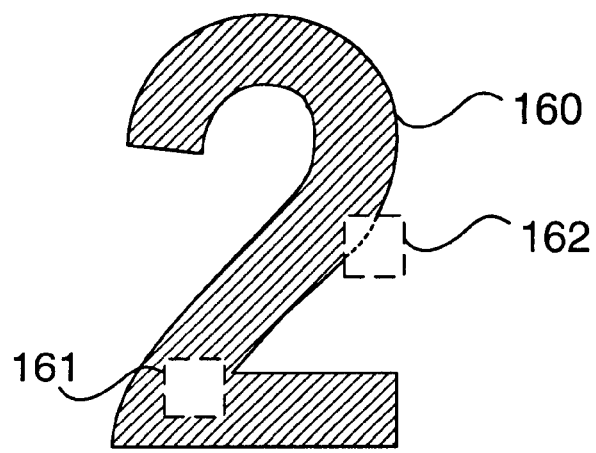
FIG. 12 shows an example of a character in a document, the numeral "2", which is presented in a shade of gray.
Figure 13:
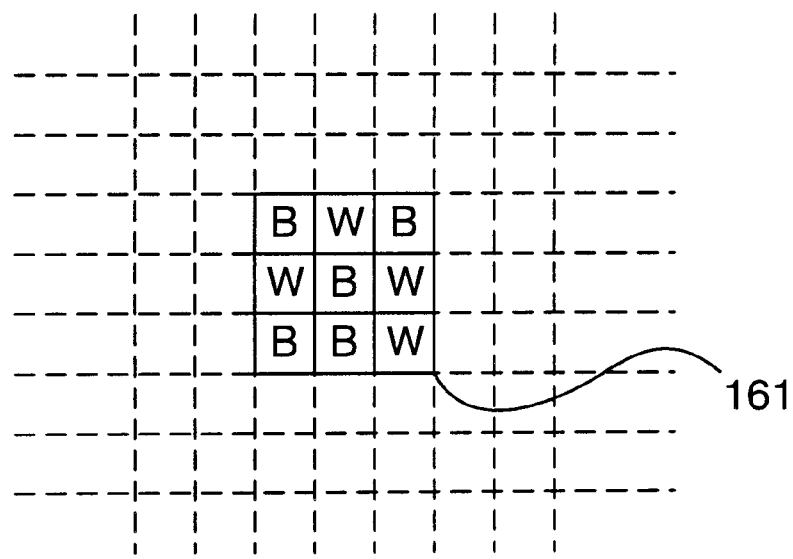
FIG. 13 is a drawing of the sub-pixels in a super-pixel 161 in the character shown in FIG. 12, showing the distribution of black and white sub-pixels to reproduce the shade of gray.

FIGS. 12 and 13 illustrate this technique. In FIG. 12, the numeral "2" 160 is presented in a shade of gray (shown by cross-hatch lines in the drawing). A single super-pixel 161 is indicated, lying within this gray region. For purposes of clarity, the size of this super-pixel 161 is greatly exaggerated, compared to the relative sizes of pixels and characters in ordinary documents.

FIG. 13 shows an enlarged view of super-pixel 161, which constitutes a 3×3 array of sub-pixels. The dotted lines in this drawing indicate the locations of neighboring sub-pixels. In order to represent the shade of gray in the orginal character 160, the sub-pixels in the super-pixel 161 are apportioned between "black" and "white" sub-pixels. In this example, the particular shade is represented by four white sub-pixels and five black sub-pixels. These black and white sub-pixels are distributed in a fairly homogeneous manner over the super-pixel 161.

It is immediately clear from these drawings that this technique enables each super-pixel to carry eight shades of gray-scale information about the original object, namely pure white, total black, and seven intermediate shades. The shade is determined by the apportionment of sub-pixels between "black" and "white".

It will be recognized further that there is a price paid for this additional pixel information in terms of resolution. The super-pixels are three times as large as the original pixels. The edges of characters or figures will thus be "smeared out" by a distance comparable to the size of the super-pixels. For example, FIG. 12 illustrates a super-pixel 162 that is located at the edge of the character. (Again, the size of this super-pixel is greatly exaggerated). Since this super-pixel 162 represents a single shade of gray according to the foregoing technique, the edge of the character is thereby smeared out by an amount approximately the size of the super-pixel 162.

Figure 14:
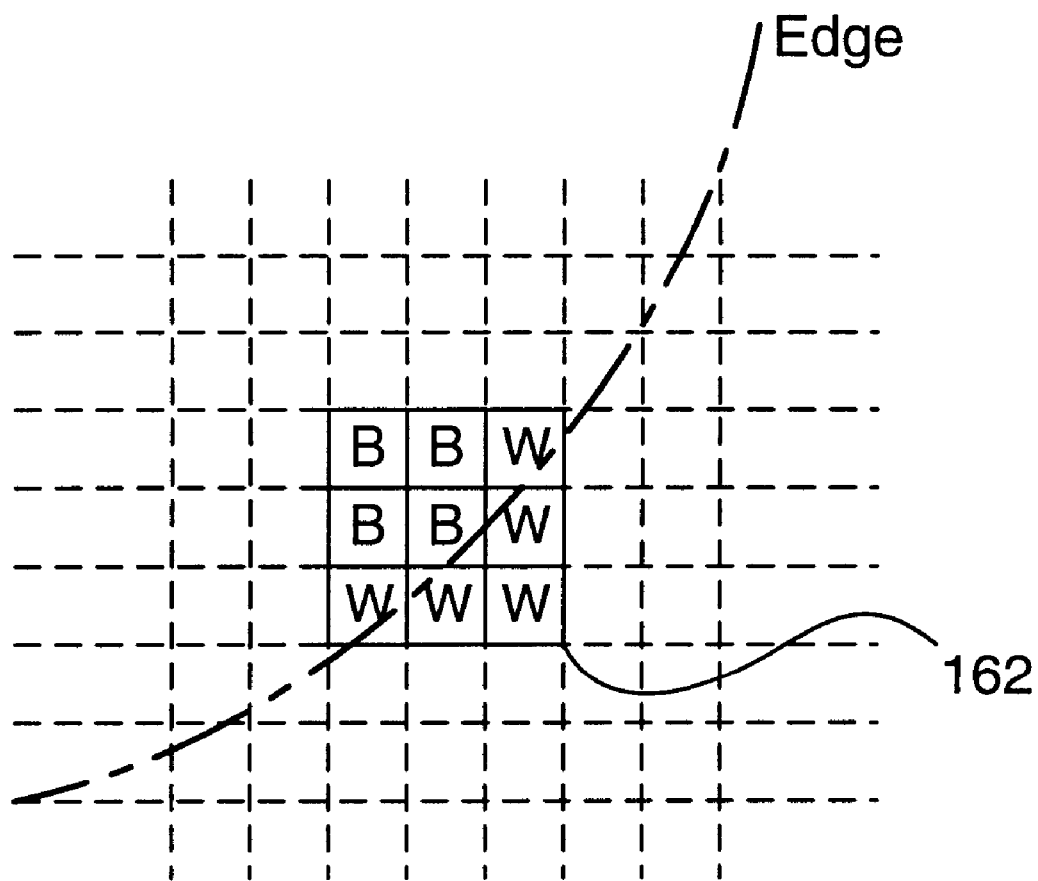
FIG. 14 is a drawing of the sub-pixels in a super-pixel 162 in the character shown in FIG. 12, showing the distribution of black and white sub-pixels to reproduce the shade of gray.

This smearing effect is partially compensated by including in the system a prescription for re-defining the black and white sub-pixels in a super-pixel to take account of the fact that the super-pixel encompasses an edge. FIG. 14 shows a drawing of the sub-pixels in super-pixel 162 in which the black and white sub-pixels are not distributed homogeneously through the super pixel. The black sub-pixels are concentrated toward the upper left corner of the super-pixel to partially reduce the smearing of the edge passing through the super-pixel 162.

It will be recognized by persons of reasonable skill in the relevant art that this edge-enhancement process is a spatial filtering technique. That is, the distribution of black and white sub-pixels in super-pixels is determined partly by sampling pixel signals located in neighboring super-pixels to determine the presence and location of an edge. The sub-pixels are apportioned between black and white according to an algorithm based on this sampling.

The present invention includes further edge-enhancement techniques to correct for smearing effects in the modulation transfer function of the camera lenses and optical system such as lens aberrations. As above, these edge-enhancement techniques are implemented by spatial digital filtering methods. The invention generally includes a digital FIR (finite impulse response) edge-sharpening filter to suppress the edge-smearing effects described above.

It will further be appreciated by persons skilled in the relevant art that all of the foregoing computations and calibration corrections can be carried out automatically with projector 11 of the present invention. The signals produced by cameras CCD1 140 and CCD2 142 are stored in image memory 26 residing on motherboard 21. Motherboard 21 is preferably part of a computer system having a microprocessor-based electronic controller with sufficient memory and software to perform these correction computations. In fact, the computational system of the present invention is preferably implemented on a personal computer that may be IBM or Apple-compabible, and the software may be constructed with known programming techniques.

In summary, interactive projector 11 photographs and stores the image of a document 13 using a dual CCD camera 15. The digital image is stored by a processor-based motherboard 21 to an array of image memory 26. The contents of memory 26 are displayed on a transparent LCD image plate 39. Using a projection lamp 29 to rear-light image plate 39, the image displayed on image plate 39 is projected onto a screen 49. A transparent plastic pressure-sensitive digitizer 41 is affixed to image plate 39 and permits a user, with the aid of a stylus 45, to point to coordinates on digitizer 41 and to change the transparency of corresponding picture elements on image plate 39. The projector 11 may be connected to a remote projector or communication device using modem 16. When projector 11 is connected to a remote projector, annotations made to image plate 39 are simultaneously transmitted to the remote projector. Also during interactive use, changes made to the image plate of the remote projector are received and used to update image plate 39 of projector 11. Image enhancement means are provided to create high-quality images of document 13 using dual CCD camera 15. An overlap-region calibration procedure is used to create a seamless image of document 13 and compensate for uneven illumination. A set of cross-polarizers 144 and 146 is used to reduce specular reflection and eliminate glare from document 13. A high-intensity strobed flash lamp 17 is used to eliminate the effects of ambient room lighting upon document 13. An interlaced scanning system is used in conjunction with flash lamp 17 to compensate for variations in flash intensity. A method of sub-dividing picture elements is used to provide greater control over image gray-scale in document 13. An automatic gain correction (AGC) procedure is used to create reference black and white levels to compensate for variations in optical reflectivity and color in document 13.

What is claimed is:

1. An interactive projector comprising:
   generating means for recording an image of a document and for storing the image digitized image data in a memory;
   image enhancement means, coupled to the generating means, for enhancing the digitized image data and storing the enhanced digitized image data in the memory;
   resolving means, coupled to the memory, for resolving as an enhanced image the enhanced digitized image data;
   projection means for projecting the resolved enhance image onto a display surface;
   input means including a coordinate input array corresponding to the resolved enhanced image, for receiving user input indicative of a desired modification to the resolved enhanced image and for responsively generating user input signals;
   image modification means, coupled to the input means and to the resolving means, for processing the enhanced digitized image data in accordance with the received user input signals to produce modified image data for resolution by the resolving means, wherein the image modification means is operative to edit, annotate, and re-size the resolved enhanced image in accordance with the received user input signals and a set of image modification rules, and storing the user input signal in the memory; and
   output means for communicating the modified image data to a remote projector for resolution and projection thereby.

2. The projector as recited in claim 1, wherein the generating means further comprises:
   a plurality of cameras, each camera being directed and disposed to record a portion of the image of the document; and
   beam splitter means for dividing the reflected light from the document into a plurality of components, and directing each component into one of said cameras.

3. The projector as recited in claim 2, wherein the generating means further comprises illumination means for producing illumination of the document, said illumination having substantially greater intensity than the intensity of ordinary ambient room light.

4. The projector as recited in claim 3, wherein the generating means further comprises:
   first polarizer means disposed in the optical path between the illumination means and the document, such that the light passing through the first polarizer means is linearly polarized along a first direction orthogonal to optical path direction; and
   second polarizer means disposed in the optical path between the plurality of camera and the document, such that the light passing through the second polarizer means is linearly polarized along a second direction orthogonal to the optical path direction, said first and second directions further being mutually orthogonal.

5. The projector as recited in claim 3, wherein the illumination means comprises a flash lamp, such that the flash lamp emits a sequence of flashes, each of which is substantially greater in intensity than ordinary ambient room light, and the document is illuminated by said flashes.

6. The projector as recited in claim 2, wherein the plurality of cameras comprises a first camera and a second camera, said first camera recording an image of a first portion of the document and said second camera recording an image of a second portion of the document, and wherein said first portion and said second portion include an overlap portion that lies in both first and second portions of the document.

7. The projector as recited in claim 6, wherein the enhancement means further comprises calibration adjustment means, such that the sensitivities of the first camera and the second camera are adjusted to produce images having the same densities on said overlap portion.

8. The projector as recited in claim 6, wherein said first camera and said second camera record images electronically by recording signals corresponding to pixels in said first and second portions.

9. The projector as recited in claim 8, wherein said pixels comprise composite pixels, each composite pixel being composed of a plurality of elementary pixels, such that said composite pixels reproduce gray scale information from the part of the document that is imaged in said composite pixel.

10. The projector as recited in claim 9, wherein the enhancement means further comprises filtering means for enhancing images of edges of characters in the document by spatial filtering of signals in the composite pixels.

11. The projector as recited in claim 1, wherein the generating means records the image of the document electronically by recording signals corresponding to pixels in said image of the document, and wherein said enhancement means further comprises filtering means for enhancing images of edges of characters in the document by spatial filtering of signals in said pixels.

12. The projector as recited in claim 1, wherein the enhancement means comprises sampling means for sampling signals from the document and adjusting the pixels in the resulting image to compensate for variations in the reflective properties of the document.

13. A method for enhancing and modifying projected images, the method comprising the steps of:

recording an image of a document and storing the image as digitized imaged data in a memory;

enhancing the digitized image data and storing the enhanced digitized image data in the memory;

resolving as an enhanced image the enhanced digitized image data;

projecting the resolved enhanced image onto a display surface;

receiving user input indicative of a desired modification to the resolved enhanced image and responsively generating user input signals;

storing the user input signals in memory:

processing the enhanced digitized image data in accordance with the received user input signals and a set of image modification rules to produce modified image data;

resolving the modified image data as a modified image and projecting the modified image; and communicating the modified image data to a remote projector for resolution and projection thereby.

14. The method of claim 13, wherein the recording step further comprises:

providing a plurality of cameras, each camera being directed and disposed to record a portion of the image of the document; and dividing the reflected light from the document into a plurality of components, and directing each component into one of said cameras.

15. The method of claim 13, wherein the recording step further comprises directing light onto the document such that the document is illuminated at a substantially greater intensity than the intensity of ordinary ambient room light.

16. The method of claim 15, wherein the recording step further comprises polarizing in first and second mutually orthogonal orientations the light directed onto the document.

17. The method of claim 14, wherein the plurality of cameras comprises a first camera and a second camera, the first camera recording an image of a first portion of the document and said second camera recording an image of a second portion of the document, and wherein said first portion and said second portion include an overlap portion that lies in both first and second portions of the document.

18. The method of claim 17, wherein the enhancing step further comprises adjusting the sensitivities of the first camera and the second camera to produce images having the same densities on said overlap portion.

19. An interactive projector network, comprising:

a plurality of interactive projectors coupled for communication by a communications network, each of the plurality of interactive projectors comprising:

generating means for recording an image of a document and for storing the image as digitized image data in a memory;

image enhancement means, coupled to the generating means, for enhancing the digitized image data and storing the enhanced digitized image data in the memory;

resolving means, coupled to the memory, for resolving as an enhanced image the enhanced digitized image data;

projection means for projecting the resolved enhanced image onto a display surface;

input means including a coordinate input array corresponding to the resolved enhanced image, for receiving user input indicative of a desired modification to the resolved enhanced image and for responsively generating user input signals;

image modification means, coupled to the input means and to the resolving means, for processing the enhanced digitized image data in accordance with the received user input signals to produce modified image data for resolution by the resolving means, wherein the image modification means is operative to edit, annotate, and re-size the resolved enhanced image in accordance with the received user input signals and a set of image modification rules, and storing the user input signals in the memory;

output means for communicating via the communications network the modified image data to a remote interactive projector for resolution and projection thereby; and receiving means for receiving via the communications network remote image data from the remote interactive projector and for storing the remote image data in the memory;

whereby conference participants located at a remote site may instantaneously view projected images of a modified document.

* * * * *